(12) United States Patent
Persson et al.

(10) Patent No.: US 9,127,589 B2
(45) Date of Patent: Sep. 8, 2015

(54) TURBO COMPOUND TRANSMISSION AND A METHOD FOR CONTROLLING A TURBO COMPOUND TRANSMISSION

(75) Inventors: Per Persson, Partille (SE); Martin West, Göteborg (SE); Göran Haraldsson, Hörby (SE)

(73) Assignee: Volvo Lastvagnar AB, Göteborg (SE)

( * ) Notice: Subject to any disclaimer, the term of this patent is extended or adjusted under 35 U.S.C. 154(b) by 422 days.

(21) Appl. No.: 13/806,148

(22) PCT Filed: Jun. 22, 2011

(86) PCT No.: PCT/EP2011/003088
§ 371 (c)(1),
(2), (4) Date: Feb. 6, 2013

(87) PCT Pub. No.: WO2011/160833
PCT Pub. Date: Dec. 29, 2011

(65) Prior Publication Data
US 2013/0205773 A1    Aug. 15, 2013

Related U.S. Application Data

(60) Provisional application No. 61/357,167, filed on Jun. 22, 2010.

(51) Int. Cl.
*F02G 3/00* (2006.01)
*F02B 33/44* (2006.01)
(Continued)

(52) U.S. Cl.
CPC . *F02B 37/00* (2013.01); *F01N 5/04* (2013.01); *F02B 39/08* (2013.01); *F02B 39/16* (2013.01);
(Continued)

(58) Field of Classification Search
CPC .......... F02B 37/00; F02B 39/08; F02B 39/16;
F02B 41/10; F01N 5/04; H02K 51/00; H02K 49/10; H02K 49/102; H02K 49/104; Y02T 10/16; Y02T 10/163; Y10S 74/05
USPC ................... 60/614, 624, 597, 620, 607–609;
290/1 C, 4 C, 44; 310/98, 103–105, 112, 310/114–115, 163, 266; 475/5; 477/172; 74/640; 192/218
See application file for complete search history.

(56) References Cited

U.S. PATENT DOCUMENTS 1,894,979 A * 1/1933 Chubb ........................... 310/163
2,727,602 A * 12/1955 Saives ........................... 192/218
(Continued)

FOREIGN PATENT DOCUMENTS

DE    102008022268 A1    1/2009
EP       03013547 A2     2/1989
(Continued)

OTHER PUBLICATIONS

International Search Report (Sep. 29, 2011) for corresponding International application No. PCT/EP2011/003088.

*Primary Examiner* — Thai Ba Trieu
(74) *Attorney, Agent, or Firm* — WRB-IP LLP (57) ABSTRACT

A turbo compound transmission, such as in a heavy duty or medium duty diesel engine, includes a turbo compound turbine to be driven by exhaust gases from an internal combustion engine, and a coupling including a first rotor including a mechanical input drive adapted to be driven by the turbine, and a second rotor including a mechanical output drive. A brake is arranged to brake and limit the rotation of the turbine. The coupling is arranged to decouple when braking with the brake, subjecting the coupling to a torque above a predetermined torque limit. A method for controlling a turbo compound transmission is also disclosed.

10 Claims, 9 Drawing Sheets

(51) Int. Cl.
- *F02B 63/04* (2006.01)
- *H02K 7/10* (2006.01)
- *H02K 7/18* (2006.01)
- *H02K 1/22* (2006.01)
- *H02K 19/00* (2006.01)
- *F02B 37/00* (2006.01)
- *F01N 5/04* (2006.01)
- *F02B 39/08* (2006.01)
- *F02B 39/16* (2006.01)
- *H02K 49/10* (2006.01)
- *H02K 51/00* (2006.01)

(52) U.S. Cl.
CPC ............ *H02K 49/102* (2013.01); *H02K 49/104* (2013.01); *H02K 51/00* (2013.01); *Y02T 10/16* (2013.01); *Y02T 10/163* (2013.01)

(56) References Cited

U.S. PATENT DOCUMENTS

| | | | | |
|---|---|---|---|---|
| 3,301,091 | A * | 1/1967 | Reese | 74/640 |
| 5,079,913 | A * | 1/1992 | Kishishita | 60/624 |
| 5,292,284 | A * | 3/1994 | Denk et al. | 464/29 |
| 5,881,559 | A * | 3/1999 | Kawamura | 60/597 |
| 6,725,662 | B2 * | 4/2004 | Baba et al. | 60/620 |
| 7,509,806 | B2 * | 3/2009 | Vogelsang et al. | 60/614 |
| 7,956,504 | B2 * | 6/2011 | Quere | 310/114 |
| 7,966,817 | B2 * | 6/2011 | Schenck et al. | 60/624 |
| 7,987,673 | B2 * | 8/2011 | Kley et al. | 60/624 |
| 8,183,802 | B2 * | 5/2012 | Quere | 310/112 |
| 8,261,550 | B2 * | 9/2012 | Sartre | 60/624 |
| 8,358,044 | B2 * | 1/2013 | Waszak et al. | 310/266 |
| 8,495,877 | B2 * | 7/2013 | Weyer et al. | 60/624 |
| 8,653,677 | B2 * | 2/2014 | West | 290/1 C |
| 8,740,746 | B2 * | 6/2014 | Figler et al. | 477/32 |
| 2004/0108781 | A1 * | 6/2004 | Razzell et al. | 310/266 |
| 2011/0037333 | A1 * | 2/2011 | Atallah et al. | 310/98 |
| 2011/0042965 | A1 * | 2/2011 | Atallah et al. | 290/1 |
| 2011/0196587 | A1 * | 8/2011 | Arnell | 701/60 |
| 2011/0294621 | A1 * | 12/2011 | Figler et al. | 477/32 |

FOREIGN PATENT DOCUMENTS

| | | | | |
|---|---|---|---|---|
| GB | 1475700 A * | 6/1977 | | B60K 17/04 |
| GB | 2127491 A * | 4/1984 | | F02C 7/36 |
| GB | 2237339 A1 | 5/1991 | | |
| GB | 2457682 A * | 8/2009 | | F16H 49/00 |
| WO | 02070877 A1 | 9/2002 | | |
| WO | 2005064137 A1 | 7/2005 | | |
| WO | WO 2007125284 A1 * | 11/2007 | | H02K 16/02 |
| WO | WO 2007144556 A1 * | 12/2007 | | H02K 49/10 |
| WO | WO 2009103994 A2 * | 8/2009 | | H02K 7/11 |
| WO | 2010050856 A1 | 5/2010 | | |

\* cited by examiner

TURBO COMPOUND TRANSMISSION AND A METHOD FOR CONTROLLING A TURBO COMPOUND TRANSMISSION

BACKGROUND AND SUMMARY

The present invention relates to a turbo compound transmission, comprising a turbo compound turbine to be driven by exhaust gases from an internal combustion engine; and a coupling, said coupling comprising a first rotor comprising a mechanical input drive adapted to be driven by the turbine, and a second rotor comprising a mechanical output drive, adapted to be connected to the crankshaft of the engine. In particular, the invention relates to a turbo compound transmission in a heavy duty or medium duty diesel engine.

In a turbo compound turbine system for recovery of energy from an exhaust gas stream of an engine to the crankshaft, there is a turbo compound turbine driven by the exhaust gas stream, and a transmission for transmitting power from the turbine to the crankshaft.

There are several requirements on such a transmission to be met in order for it to deliver power to the crankshaft during a complete drive cycle.

The transmission has to gear the turbine speed down to crankshaft speed, which usually is a speed ratio in the range of 20 to 50.

Moreover, the torsional vibrations in crankshaft should be isolated so that they are not transferred to turbine shaft.

In order to withstand stresses due to centrifugal forces at high operating speeds, e.g. an operating speed higher than the normal engine positive power speed which may occur during engine braking or as a result of an incorrect gear shift, the turbine design should be sufficiently robust. However, increasing robustness has a negative influence on turbine efficiency.

Also, during, engine braking, the power turbine might feed power to the crankshaft which is not desirable as the intention is that engine should absorb energy, when in this state.

Finally, during low (positive) torque operating points the extracted power from the turbine is lower than the transmission losses such that the crankshaft has to drive the turbine. This results in a loss of engine efficiency at low torque levels.

Previously, the above-mentioned issues have been addressed for example by splitting the speed ratio (20-50) when gearing the turbine speed down to crankshaft speed into several gear steps. Usually at least two gear steps are used.

In this case, the high speed gear usually suffers from quite significant losses as a result of the high turbine shaft speed (about 30 000 to 80 000 rpm).

As regards robustness, the solution so far has been to dimension the turbine system to withstand excessive speeds so that the turbine does not risk bursting during engine braking or a faulty gear shift.

The torsional oscillations from the crankshaft are usually damped in a viscous damper. The use of such a damper will however create a slip of ~1%, which contributes to a loss of total engine efficiency.

With conventional solutions, during engine brake mode, power from the power turbine is fed to the crankshaft resulting in a loss of total engine braking power.

WO2010/050856 discloses an arrangement for automatically adjusting torque transmitting ability of a hydrodynamic coupling. This is done in dependence of one or several parameters; a to c. A torque transmitted by said coupling is continuously adjusted in order to adjust one or several of said parameters a to c to below or above a certain value.

DE102008022268 discloses a magnetorheological clutch. When driving the engine at low loads the clutch is disengaged. This is done by interrupting the electric current normally flowing through and creating the magnetic field in the coil.

GB2237339 discloses a variable transmission where a rotor can be moved along the splined end of a shaft in order to vary energy transfer and thereby braking.

WO2005/064137 discloses a hydrodynamic clutch (4.1, 4.4) that can be used as a retarder by using a brake 5 for braking a primary rotor connected to an exhaust turbine.

EP0301547 discloses a turbo compound engine where an exhaust turbine is used in a similar way as in WO2005/064137 by applying a clutch 51 {brake) and allowing some slip in order to protect the transmission. WO02/070877 discloses an arrangement similar to the one in WO2005/064137, comprising the retarder functionality.

It is desirable to provide a turbo compound transmission, which provides an improvement in relation to one or more of the above-mentioned issues.

The present invention relates to a turbo compound transmission, comprising:
a turbo compound turbine to be driven by exhaust gases from an internal combustion engine; and
a coupling comprising
  a first rotor comprising a mechanical input drive adapted to be driven by the turbine,
  a second rotor comprising a mechanical output drive,
  the transmission being characterized in that a brake is arranged to brake and limit the rotation of said turbine and where said coupling is arranged to decouple when braking with said brake and when the torque over the coupling is above a predetermined torque limit.

When coupled, the coupling will transmit a fixed torque ratio and a fixed speed ratio between said rotors. By "decouple" is meant herein that the coupling will no longer accomplish said fixed ratios. The coupling will become completely decoupled, so as to transfer no or substantially no torque.

According to the invention a brake is provided, which is intended to reduce the speed of the turbine or to stop the turbine when the engine operates at excessive engine speed, when the engine is in engine brake mode or at low positive torques, i.e. where the turbine power is lower than the transmission losses.

Advantageously, the speed of the turbine could be reduced to zero speed (stopped) or to close to zero speed.

When the turbine is slowed down, the coupling between the turbine and the mechanical output drive of the coupling, which is typically connected to the crankshaft of the engine, will, be subject to a torque. The coupling is adapted to transmit all torques below a predetermined torque limit, but to decouple when the torque over the coupling is above said predetermined torque limit. Accordingly, it is possible to slow down or to stop the turbine without affecting, the engine crankshaft.

The torque limit should be selected so as to be high enough to transmit power from the turbine to the crankshaft in engine operating points where the turbine power contribute to the engine efficiency.

Since the turbine may be stopped at excessive engine speeds, the turbine design does not have to withstand such excessive speeds without bursting. Accordingly, the geometry of the turbine can instead be optimised for achieving the best thermodynamic efficiency. The turbine can be designed to endure a burst speed being a lower speed than what corresponds to the crankshaft maximum speed times the gear ratio between crankshaft, and turbine.

Moreover, by stopping the turbine, or slowing it down to almost zero speed, the power dissipated in the brake becomes negligible.

In accordance with the invention, the turbine may be slowed down or stopped also whet the engine is in engine brake mode. An engine in a vehicle, in particular a heavy duty or medium duty engine, is not only used for creating positive power, but also for absorbing power when in an engine brake mode. This is advantageous inter alia for saving the vehicle's service brakes. When braking the turbine during engine brake mode, there will be no power fed to the crankshaft from the turbine, a id accordingly the engine brake power performance will be improved in relation to previous solutions.

Moreover, transient operation of the engine, as occurring when the engine speed is increased, is improved if the turbine speed can lag behind the increase of engine speed. When the coupling between turbine and crankshaft is decoupled, the torque required to accelerate the inertia of the turbine does not load the engine crankshaft. Instead, the turbine will be driven by exhaust gases. When the turbine speed reach synchronous speed with the crankshaft speed, the coupling may again be recoupled.

Accordingly, the coupling is advantageously designed so as to enable recoupling when the mechanical input drive speed is substantially the same as the mechanical output drive speed.

One example of transient operation is during a rapid speed change of the crankshaft, which could improve normal gear change. Another example of transient operation is an engine speed increase caused by a faulty gear shin. After a faulty gear shift the engine speed accelerates very quickly. Accordingly, the coupling may be designed to decouple during such acceleration and, as a result, keep the turbine below ifs burst speed.

Preferably, said coupling is a magnetic coupling, and a maximum torque transmission capability of said magnetic coupling defines said predetermined torque limit, such that said magnetic coupling is arranged to be detached when braking with said brake results in a torque over said coupling above the maximum torque transmission capability.

The maximum torque transmission capability of a magnetic coupling will depend on its design, the magnets used etc. and may be selected to an appropriate value for the intended application.

A magnetic coupling or magnetic gear exploits a magnet-to-magnet coupling principle which enables high torques to be transmitted. The magnetic gear element also introduces a degree of compliance into the drive train. As the torque increases a "load angle" will appear between the input and output rotors. This load angle can be defined as the electrical angle between the magnetic field produced by one rotor and a field with the same pole number produced either by the harmonic of a magnetic field produced by the static magnet array and modulating pole pieces or by a second rotating array of magnets, depending on the specific configuration of the magnetic coupling.

The load angle will in this case act as a non-linear torsional spring or compliance, which in combination with the inertia of the rotating parts acts as a low pass filter reducing the magnitude of the torsional oscillations.

The magnetic coupling transfers torque when displaying certain load angles. When subject to a torque higher than a predetermined torque limit, the load angle will increase to an extent such that the magnetic coupling starts to detach, "decouples".

When the brake is not engaged, the magnetic coupling will operate in accordance with the present load angle, and power will be transferred from the turbine to the crankshaft.

In addition to the magnetic coupling, gears may be connected between the turbine and the crankshaft to achieve an appropriate total speed ratio. Alternatively, the magnetic coupling may be designed as a magnetic gear which alone achieves the appropriate total speed ratio. Also several, for example two, magnetic gears may be used.

The magnetic, coupling may be designed to have a speed ratio of 1:1, or may alternatively be designed as a magnetic gear with a ratio other than 1:1. Such a magnetic gear will have a lower rotational stiffness than a conventional gear mesh, and accordingly no hydrodynamic clutch (normally included in a turbo compound transmission) is required. This is advantageous since a hydrodynamic clutch normally suffers from a slip which in turn causes power losses. Moreover, any windage losses associated with the hydrodynamic coupling housing may be avoided.

Moreover, the high speed gear in a conventional turbo compound transmission can be replaced with a magnetic gear such that the high speed gear mesh-losses and windage losses may be reduced.

Advantageously, the magnetic coupling may comprise a first structure, comprising a first quantity of permanent magnets, said first structure being a high speed rotor and being the first rotor comprising said mechanical input drive adapted to be driven by the turbine.

Preferably, the magnetic coupling further comprises a second structure, being concentric with said first structure, said second structure comprising a second quantity of permanent magnets.

Preferably, the second structure is the second rotor comprising said mechanical output drive.

Optionally, the magnetic coupling may comprise a third structure, being concentric with said first and second structures, and being arranged in between said first structure and said second structure.

Advantageously, one of said second and third structures is the second rotor comprising said mechanical output drive, and the other of said second and third structures is non-rotatably fixed to a housing and unconnected to a mechanical drive.

Preferably, the third structure, when present, may be a plural pole element or a plural pole rotor.

When the magnetic coupling is in a detached state, an oscillating torque over said magnetic coupling has a mean torque of zero.

Preferably, when the torque over said magnetic coupling is below said predetermined torque limit, the magnetic coupling transmits a fixed torque ratio and a fixed speed ratio between said rotors.

Preferably, the brake of the turbo compound transmission is one of a friction type brake, hydraulic type brake or eddy current type brake.

Advantageously, the brake comprises a first and a second brake element, which interact when braking, and where said first brake element is rotationally fixed to said first rotor and said second brake element is rotationally fixed to a housing of said turbo compound transmission.

Advantageously, the brake is an electromagnetic brake.

Preferably, when the coupling is a magnetic coupling, wherein the brake may be formed as an electromagnetic brake, in that the magnetic coupling acts as an electric machine on the permanent magnets of the first rotor.

Advantageously, the brake is an item separate from the coupling per se.

Alternatively, the brake may be incorporated in the coupling.

The brake may preferably act so as to affect the high speed rotor of the coupling.

Optionally, a high speed gear may be arranged in between the turbine and said first rotor.

The predetermined torque limit may readily be determined by a person skilled in the art, taking into account the various purposes of the braking as described herein.

Preferably, the braking is controlled by a control element, using the engine operation load point as input.

With engine operation load point is meant a point in a torque versus engine speed curve of the engine. Accordingly, both engine speed and torque may be used as parameters for determining when to activate the brake. To this end, different operating areas may be established, corresponding to different conditions where braking is desired.

In an alternative expression, the invention relates to a turbo compound transmission, comprising:
a turbo compound turbine driven by exhaust gases from an internal combustion engine; and
a coupling comprising
a first rotor comprising a mechanical input drive adapted to be driven by the turbine,
a second rotor comprising a mechanical output drive, characterized in that a brake is arranged to brake and limit the rotation of said turbine and where said coupling is arranged to be detached when braking with said brake results in a torque over said coupling above a predetermined torque limit.

In a first advantageous embodiment, the coupling is a magnetic coupling comprising a high speed rotor with a first quantity of permanent magnets, said first rotor being, said high speed rotor comprising said mechanical input drive adapted to be driven by the turbine, a second concentric structure comprising of a second quantity of permanent magnets, said second rotor being said second concentric structure comprising said mechanical output drive, and where said magnetic coupling upon said braking is overloaded in order to exceed the maximum torque transmission capability of said magnetic coupling.

in a second advantageous embodiment, the coupling is a magnetic coupling comprising a high speed rotor with a first quantity of permanent magnets, said first rotor being said high speed rotor comprising said mechanical input drive adapted to be driven by the turbine, a second concentric structure comprising of a second quantity of permanent magnets, where said second structure being non-rotatably fixed to a housing and unconnected to a mechanical drive, a third concentric structure arranged in between said high speed rotor and said second concentric structure, and wherein said third concentric structure being a plural pole rotor and being said second rotor connected to said mechanical output drive, and where said magnetic coupling upon said braking is overloaded in order to exceed the maximum torque transmission capability of said magnetic coupling.

In a third advantageous embodiment, the coupling is a magnetic coupling comprising s a high speed rotor with a first quantity of permanent magnets, said first rotor being said high speed rotor comprising said mechanical input drive adapted to be driven by the turbine, a second concentric structure being said second rotor connected to said mechanical output drive, and comprising of a second quantity of permanent magnets, a third concentric structure arranged in between said high speed rotor and said second concentric structure, where said third concentric structure being a plural pole rotor non-rotatably fixed to a housing and unconnected to a mechanical drive, and where said magnetic coupling upon said braking is overloaded in order to exceed the maximum torque transmission capability of said magnetic coupling.

The advantageous embodiments described above may optionally be combined with other features as described herein.

In another aspect, the invention relates to a method for controlling a turbo compound transmission, comprising:
a turbo compound turbine to be driven by exhaust gases from an internal combustion engine; and
a coupling comprising
a first rotor comprising a mechanical input drive adapted to be driven by the turbine,
a second rotor comprising a mechanical output drive,
a brake being arranged to brake and limit the rotation of said turbine and where said coupling is arranged to decouple when braking with said brake subjects the coupling to a torque above a predetermined torque limit,
said method comprising,
using the operation load point of said engine as input, and controlling said brake so as to brake when said engine operation load point is positioned in a predetermined operating area, so as to reduce the turbine's speed thereby causing the coupling to decouple.

It will be understood that the method as described above may be combined with all of the different features and advantages as described herein in relation to the turbo compound transmission.

BRIEF DESCRIPTION OF THE DRAWINGS

The invention will now be described in relation to exemplary embodiments, with reference to the accompanying drawings wherein.

Like reference numerals refer to similar features in the different figures.

DETAILED DESCRIPTION OF PREFERRED EMBODIMENTS

Figure 1:
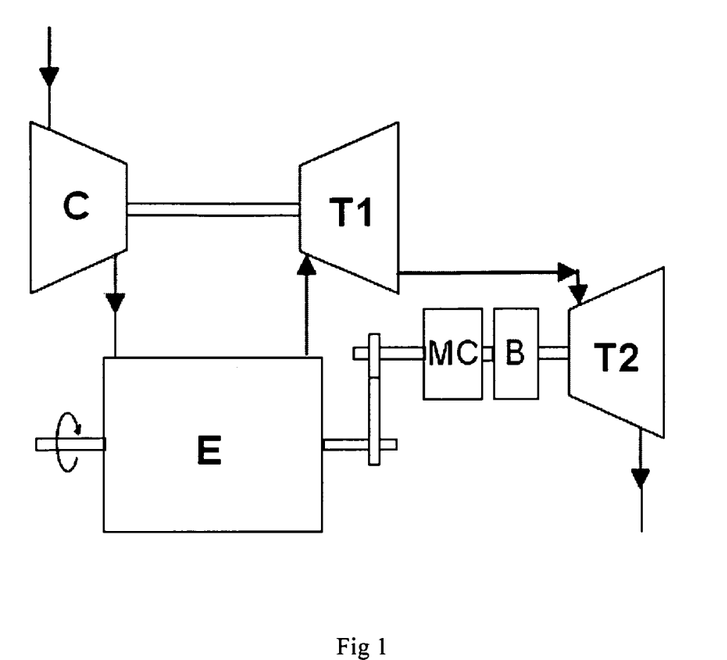
FIG. 1 illustrates schematically an embodiment of a turbo compound turbine including a magnetic coupling and a brake in accordance with the invention.

FIG. 1 illustrates an embodiment of a turbo compound turbine system. An engine E is fed with compressed air via a compressor C. The exhaust gases from the engine E is fed to a first turbine T1, which is driven by the exhaust gas flow. Moreover, a second turbine T2 is arranged in the exhaust path from the Engine E. The second turbine T2 is coupled to the engine's E crankshaft. Between the second turbine T2 and the crankshaft there is arranged a coupling, in this embodiment a magnetic coupling MC, and a brake B for braking the second turbine T2.

Figure 2:
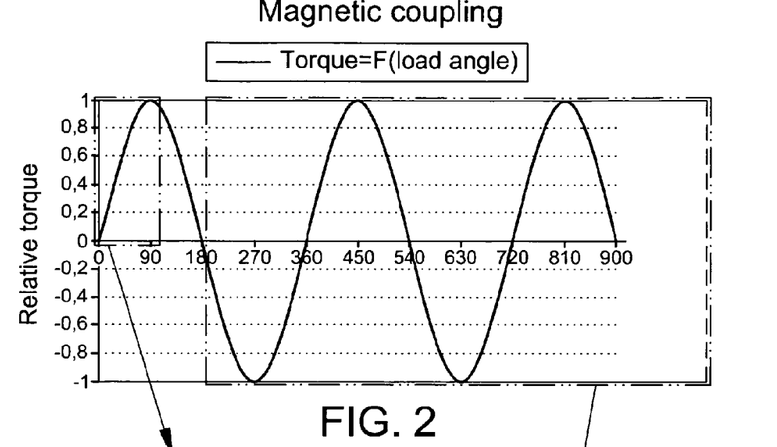
FIG. 2 is a diagram which illustrates an example of transferred torque over load angle of a magnetic coupling.

FIG. 2 illustrates how the magnetic coupling transfers torque for certain load angles. The magnetic coupling exploits a magnet-to-magnet coupling principle which enables high torques to be transmitted. The magnetic gear element also introduces a degree of compliance into the drive train. As the torque increases a "load angle" appears between the input and output rotors. This load angle can be defined as the electrical angle between the magnetic field produced by one rotor and a field with the same pole number produced either by the harmonic of a magnetic field produced by the static magnet array and modulating pole pieces or by a second rotating array of magnets.

The load angle in this case acts as a non-linear torsional spring or compliance, which in combination with the inertia of the rotating parts acts as a low pass filter reducing the magnitude of the torsional oscillations.

For a given high positive or negative torque level the load angle will exceed positive or negative 90 degrees and the magnetic coupling will start to decouple, (that is relative torque=1 in FIG. 2).

Figure 3:
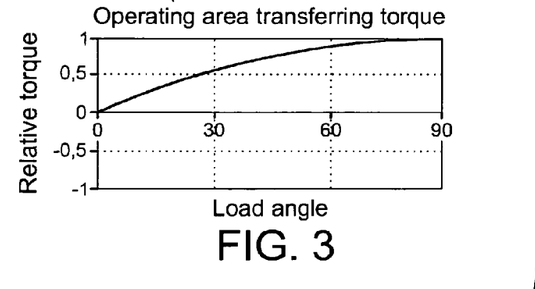
FIG. 3 is an enlargement of a part of FIG. 2; illustrating an operating area transferring, torque.

In an exemplary embodiment, the magnetic coupling is connected between the turbine and the crankshaft in addition to gears to achieve appropriate total speed ratio. When the brake is not engaged, power is transferred from the turbine to the crankshaft, and the magnetic coupling operates according to the load angle region indicated in FIG. 3 (being an enlargement of a region of FIG. 2).

Figure 4:
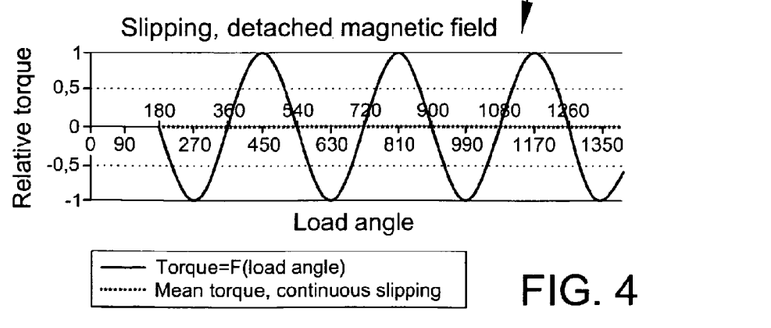
FIG. 4 is a diagram which illustrates relative torque of the magnetic coupling during, decoupling (slipping)

In FIG. 4 it is illustrated how the relative torque varies with the load angle during slipping or decoupling. In particular, it is noted that the mean torque during decoupling is zero.

Accordingly, the power dissipated in the coupling becomes negligible.

In view of the above, it is understood that the magnetic coupling has a certain torque level above which it starts to slip/decouple (relative torque=1, see FIG. 2). During decoupling, the mean torque that is zero and thereby no (or negligible) power is dissipated in this magnetic coupling, see FIG. 4.

This means that the system does not require a clutch to avoid any slip power/energy (energy=Integral [torque*angle]).

However, the oscillating torque with mean torque being zero which occurs during decoupling might put a strain on bearings and/or create noise. If any of those problems arise, a one way clutch may be used to solve these issues.

The function of the brake mentioned above is to stop or to reduce the speed of the turbine when the engine is operating at excessive speed or when the engine is in engine brake mode.

Figure 5:
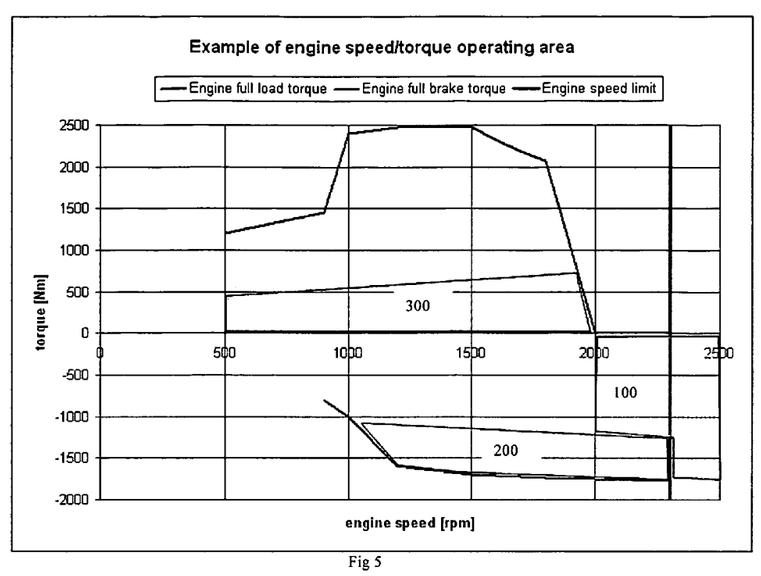
FIG. 5 is a diagram illustrating an example of an engine speed versus torque operating area.

In FIG. 5, an example of engine speed/torque operating area is illustrated where the engine is operating at excessive speed 100; or when the engine is in engine brake mode 200.

The brake can also be used to stop the turbine at low torque operating points, when transmission losses are higher than the power extracted by the turbine. Accordingly, power being extracted from the crankshaft to drive the turbine may be avoided, and hence the specific fuel consumption of the engine may be improved. An example of such an operating area 300 is shown in FIG. 5.

The magnetic coupling might have speed ratio 1:1 but might also be designed as a magnetic gear with a gear ratio differing from 1:1. Such a magnetic coupling has a lower rotational stiffness compared to a conventional gear mesh and thereby can allow a hydrodynamic clutch (normally included in a turbo compound transmission) to be omitted, and the slip associated with the hydrodynamic clutch can be avoided and avoids the power loss cause by the slip. The high speed gear in a conventional turbo compound transmission can be replaced with a magnetic gear and the high speed gear meshlosses and windage losses can be reduced. There are also windage losses associated with the hydrodynamic coupling housing which can be omitted.

A heavy duty or a medium duty engine in a vehicle is not only used for positive power but also for adsorbing power in order to save service brakes, engine brake mode. Another advantage of braking the turbine during engine brake mode is to remove the power fed to crankshaft during engine-brake mode and thereby improving engine-brake power performance.

Transient operation of the engine, as when increasing engine speed, is improved, if the turbine speed can lag behind the increase of engine speed as the torque required to accelerate the inertia of the turbine does not load the engine crankshaft. When decoupled the turbine will be driven by exhaust gases and the speed will reach synchronous speed and magnetic coupling will be recoupled. One example of transient operation is more rapid speed change of the crankshaft, improving normal gear change. Another example of transient engine speed increase is during faulty gear shifting. After faulty gear shift the engine speed accelerates very quickly and the magnetic clutch can be design for to disengage during such acceleration and keep the turbine below burst speed A controller, such as the controller element 67 in FIG. 6, may engage the brake during the steady state operating points or during the transient events based on signals from the Engine Control Unit, the Transmission Control Unit and sensor information. The controller determines the speed to which the turbine should be controlled to. When the braking torque on the turbine is removed, the turbine will be accelerated by the exhaust gasses. As the turbine speed approaches synchronous speed with the rotating magnetic field the brake may be used to assist in matching the speeds.

Figure 6:
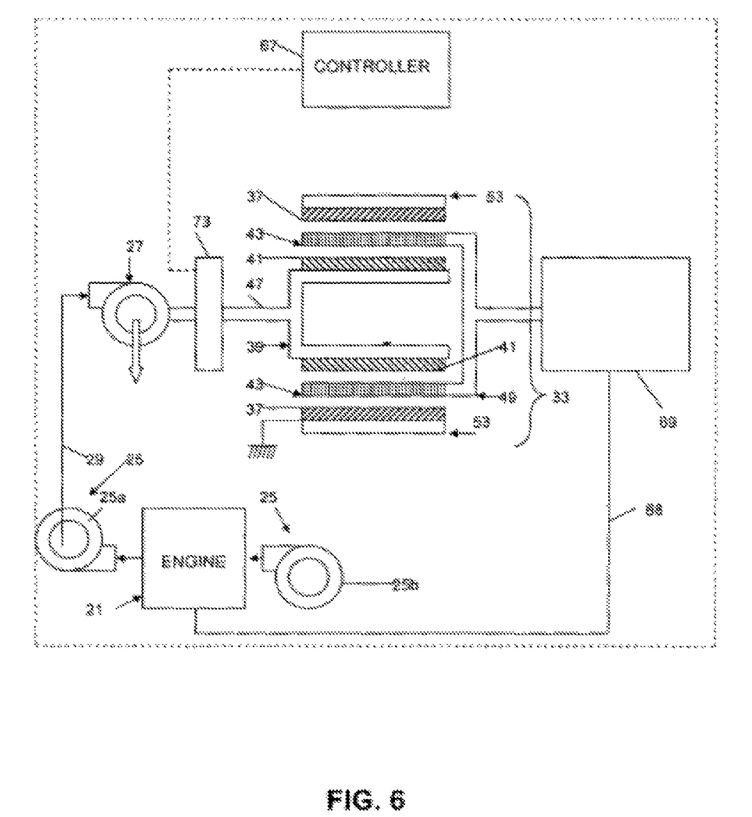
FIG. 6 illustrates schematically a first embodiment of a turbo compound transmission in accordance with the invention.

FIG. 6 illustrates an embodiment with a combustion engine 21 with a turbocharger 25 including a turbocharger turbine 25a and a turbocharger compressor 25b. However, it will be understood that the turbocharger 25 is optional. The engine 21 is coupled via a crankshaft or coupling 68 to a load such as a flywheel 69.

Moreover, the system includes a power recovery turbine 27 (hereinafter referred to as "turbine", "turbo compound turbine" or the like), driven by exhaust gases from the engine 21. An exhaust conduit 29 connects the turbine 27 to the engine 21.

The system further includes a coupling 33, in this embodiment the coupling comprises of a magnetic gear arrangement 33. The coupling comprises a first rotor comprising a mechanical input drive 47, adapted to be driven by the turbine 27, and a second rotor comprising a mechanical output drive 51.

A brake 73 is arranged so as to brake and limit the rotation of said turbine. The brake is controlled by a controller 67.

The coupling is designed such that it will decouple when braking with said brake 73 results in a torque over said coupling higher than a predetermined torque limit.

In the illustrated embodiment, the coupling comprises a magnetic gear arrangement where first rotor 39 is a high speed rotor, comprising a first quantity of permanent magnets 41, the second rotor is a low speed rotor 51, being a plural pole rotor 43 and having mechanical output drive 51. Moreover, a second quantity of permanent magnets 37 is arranged concentrically with the second rotor. The second quantity of permanent magnets is connected to a second structure 53 which is non-rotatably fixed to a housing and unconnected to a mechanical drive.

Figure 7:
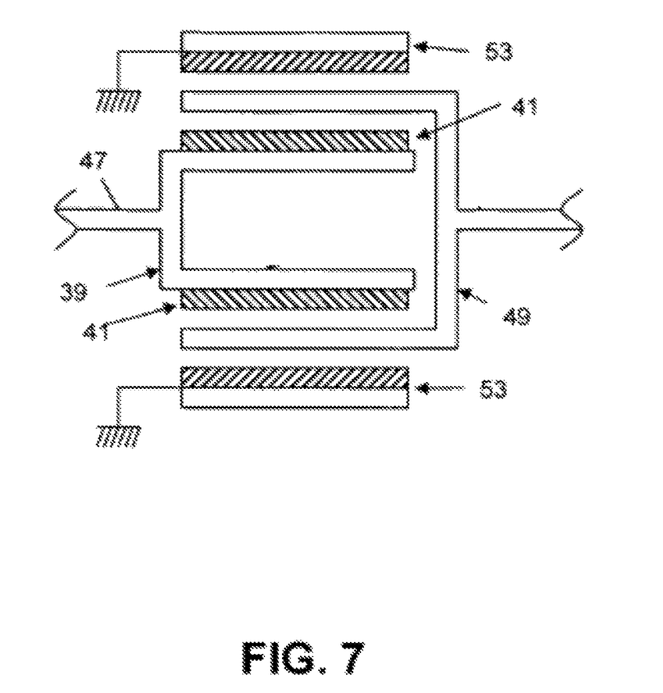
FIG. 7 illustrates schematically a first example of a magnetic coupling which may be used with the invention.

A coupling 733 in FIG. 7 is an enlargement of the coupling 33 of FIG. 6.

Figure 8:
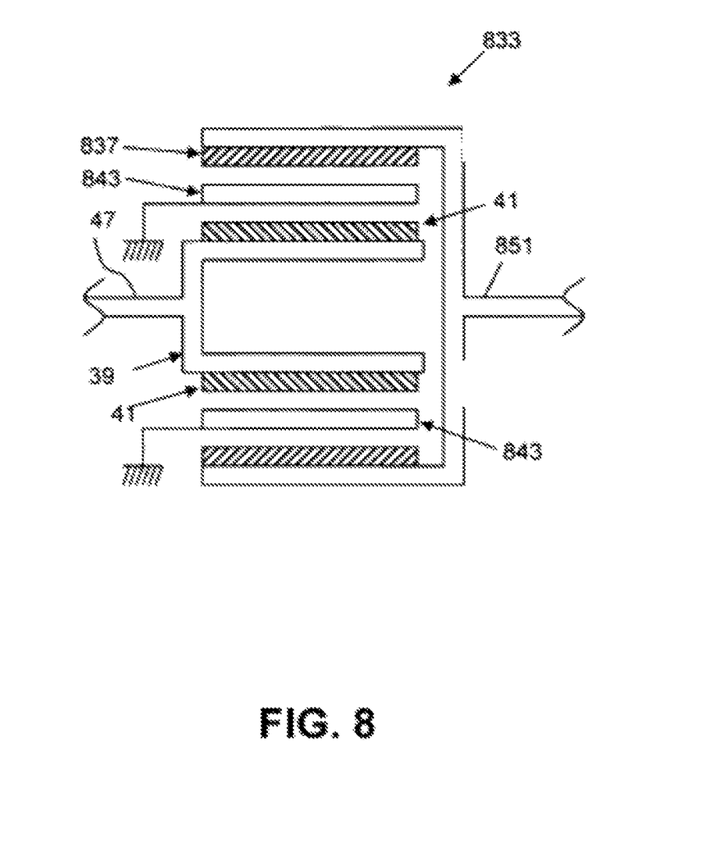
FIG. 8 illustrates schematically a second example of a magnetic coupling which may be used with the invention.

FIG. 8 illustrates an embodiment of a coupling 833 which may be used in a turbo compound system such as the one described in FIG. 6. In this example, the first rotor 39 carries a first quantity of permanent magnets 41, as in the embodiment of FIG. 6. The second rotor 849 comprises a second quantity of permanent magnets 837 and a second mechanical output drive 851. A third structure being non-rotatably fixed to a housing an unconnected to a mechanical drive comprises a plural pole element 843.

Figure 9:
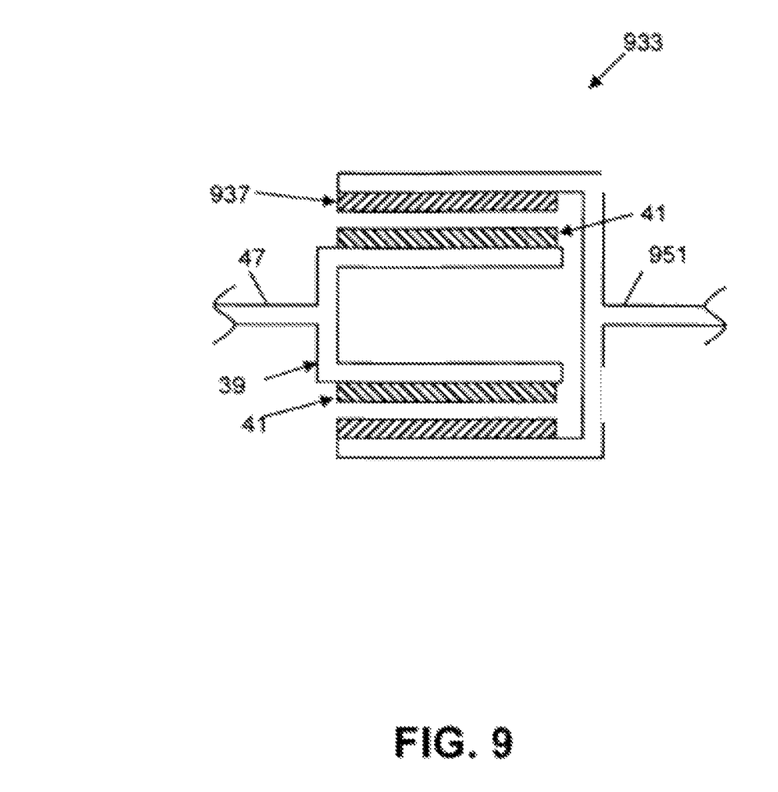
FIG. 9 illustrates schematically a third example of a magnetic coupling which may be used with the invention.

FIG. 9 illustrates an embodiment of a coupling 933 which may be used in a turbo compound system such as the one described in FIG. 6. In this example, the first rotor 39 comprises a first quantity of permanent magnets 41. The second rotor 949 comprises a second quantity of permanent magnets 937 and a second mechanical output drive 951.

In the embodiment of FIG. 9 there is no plural pole rotor or a third concentric structure with plural poles.

FIGS. 6 to 9 disclose rotors with magnets arranged concentrically in different radial planes. The invention can also be implemented with magnetic coupling where magnets with rotors are arranged concentrically but instead in different axial planes.

Many other alternatives of magnetic couplings may be suitable for use in connection with the invention. For example, magnetic gears such as described in WO 2007/144556 and WO 2007/125284 may be used.

Although magnetic, couplings are most preferred, the invention is not restricted thereto. Any coupling with behaviour similar to the described magnetic coupling, transferring torque up to a certain level, and not transferring any mean torque a above that level can be used as well. For example, a mechanical coupling similar to a coupling arranged in an electric screw driver could be used, where when torque over said coupling exceeds a certain maximum torque limit the coupling is detached and torque transmission to the screw ceases.

Figure 10:
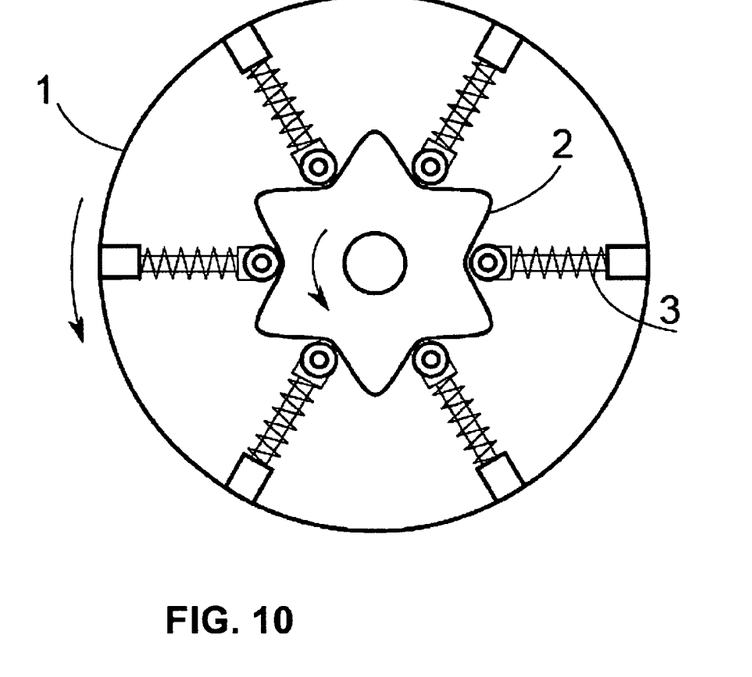
FIG. 10 illustrates an example of a mechanical coupling which may be used with the invention.

FIG. 10 describes an example of such a mechanical coupling comprising an input or output rotor 1 holding sprung cam followers 3, and an input or output cam rotor 2.

Mechanical couplings will generally suffer more losses due to friction than magnetic couplings.

FIGS. 6-10 illustrate embodiments where the brake is an item being separate from the coupling.

Figure 11:
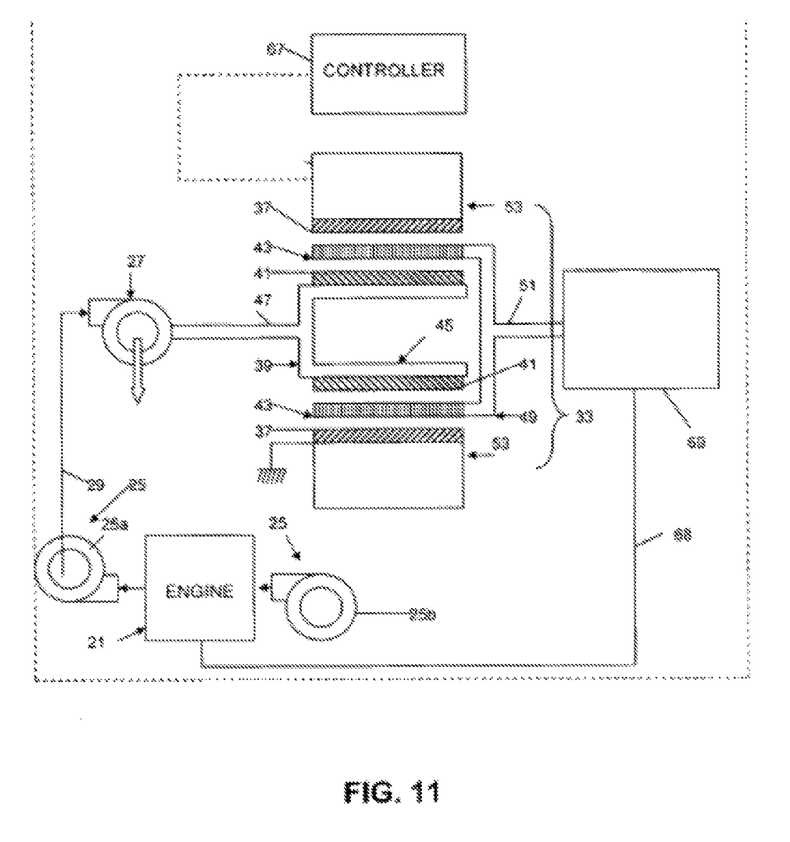
FIG. 11 illustrates schematically a second embodiment of a turbo compound transmission in accordance with the invention.

FIG. 11 illustrates a different embodiment where the brake is incorporated in the same item as the coupling. The coupling is in this case a magnetic coupling 33, wherein a brake stator is arranged to act magnetically to exert a braking force on the high-speed rotor 39. In this embodiment the brake stator 53 (which is adapted to function as a brake) is arranged concentrically with the magnetic rotors 39, 49 and acts magnetically through the outer magnets 37 and pole-piece rotor 43 to exert a braking torque on the high-speed rotor 39. Such an arrangement of brake stator and brake rotor is functionally similar to an electric machine with a large airgap. By reutilising the high-speed rotor in the brake device, the inertia and axial length of the turbo-compound system may be reduced.

In embodiments where the brake is functionally similar to an electric machine, a positive motoring torque may be exerted on the high-speed rotor. By active control of the torque of the brake device the slip angle can be controlled allowing a magnetic transmission with smaller dimensions.

An example of an electrical machine which is suitable for use in the above-described embodiment is shown in WO 2007/125284.

In view of the above, it will be understood that, in accordance with the invention, improved total engine efficiency and improved brake performance may be obtained. In particular, these advantages may be due to factors such as a) improved turbine geometry/efficiency b) lower gear mesh/windage losses in high speed gear c) removing slip losses in hydrodynamic clutch d) avoiding crankshaft driving power turbine at low torque operating points e) not feeding turbine power into crankshaft during engine brake mode f) less oil needed for cooling and lubrication of the turbo compound transmission g) less noise from the high speed gear h) inherent protection to the turbine shaft and gear meshes from sudden engine speed changes or excess torque i) remove windage losses from the hydrodynamic clutch.

The person skilled in the art will readily be able to envisage additional alternatives to the embodiments described herein, falling within the scope of the present invention.

The invention claimed is:

1. A turbo compound transmission, comprising:
a turbo compound turbine to be driven by exhaust gases from an internal combustion engine; and
a coupling comprising
a first rotor comprising a mechanical input drive adapted to be driven by the turbine,
a second rotor comprising a mechanical output drive, and
a brake arranged to brake and limit the rotation of the turbine, the coupling being arranged to decouple when braking with the brake, and the coupling is arranged to decouple above a predetermined torque limit,
wherein the coupling is a magnetic coupling, and wherein a maximum torque transmission capability of the magnetic coupling defines the predetermined torque limit, such that the magnetic coupling is arranged to be detached when braking with the brake results in a torque over the coupling above the maximum torque transmission capability, the magnetic coupling comprising the first rotor having the mechanical input drive driven by the turbine and a first quantity of permanent magnets wherein the first rotor is a high speed rotor,
the second rotor being concentric with the first rotor, the second rotor comprising a second quantity of permanent magnets, and
a third rotor, the third rotor being concentric with the first and second rotor and being arranged in between the first rotor and the second rotor, wherein one of the second and third rotors comprises the mechanical output drive, and the other of the second and third rotors is non-rotatably fixed to a housing and unconnected to a mechanical drive.

2. The turbo compound transmission according to claim 1, wherein the second rotor comprises the mechanical output drive.

3. The turbo compound transmission according to claim 2, wherein the third rotor comprises a plural pole element, or a plural pole rotor.

4. The turbo compound transmission according to claim 1, wherein, when the magnetic coupling is in a detached state, an oscillating torque over the magnetic coupling has a mean torque of zero.

5. The turbo compound magnetic transmission according to claim 1, wherein, when the torque over the magnetic coupling is below the predetermined torque limit, the magnetic coupling transmits a fixed torque ratio and a fixed speed ratio between the rotors.

6. The turbo compound transmission according to claim 1, wherein the brake is one of a friction type brake, hydraulic type brake or eddy current type brake.

7. The turbo compound transmission according to claim 1, wherein the braking is controlled using the engine operation load point as input.

8. The turbo compound transmission according to claim 1, wherein the brake is an electromagnetic brake.

9. The turbo compound transmission according to claim 8, wherein the brake is formed in the magnetic coupling acting as an electric machine on the permanent magnets of the first rotor.

10. A method for controlling a turbo compound transmission, comprising:
a turbo compound turbine to be driven by exhaust gases from an internal combustion engine; and
a coupling comprising
a first rotor comprising a mechanical input drive driven by the turbine,
a second rotor comprising a mechanical output drive (61),
a brake being arranged to brake and limit the rotation of the turbine and where the coupling is arranged to decouple when braking with the brake and the coupling is arranged to decouple above a predetermined torque limit,
wherein the coupling is a magnetic coupling, and wherein a maximum torque transmission capability of the magnetic coupling defines the predetermined torque limit, such that the magnetic coupling is arranged to be detached when braking with the brake results in a torque over the coupling above the maximum torque transmission capability, the magnetic coupling comprising the first rotor having the mechanical input drive adapted to be driven by the turbine and a first quantity of permanent magnets wherein the first rotor is a high speed rotor,
the second rotor being concentric with the first rotor, the second rotor comprising a second quantity of permanent magnets, and
a third rotor, the third rotor being concentric with the first and second rotor and being arranged in between the first rotor and the second rotor, wherein one of the second and third rotors comprises the mechanical output drive, and the other of the second and third rotors is non-rotatably fixed to a housing and unconnected to a mechanical drive,
the method comprising,
determining an operation load point of the engine as input, and
controlling the brake so as to brake in response to the operation load point being positioned in a predetermined operating area, so as to reduce speed of the turbine thereby causing the coupling to decouple.

* * * * *